May 12, 1970 K. BICK ET AL 3,511,261
CONTROLLABLE TEEMING VALVE FOR STEEL-CASTING LADLES
Filed Nov. 24, 1965 6 Sheets-Sheet 1
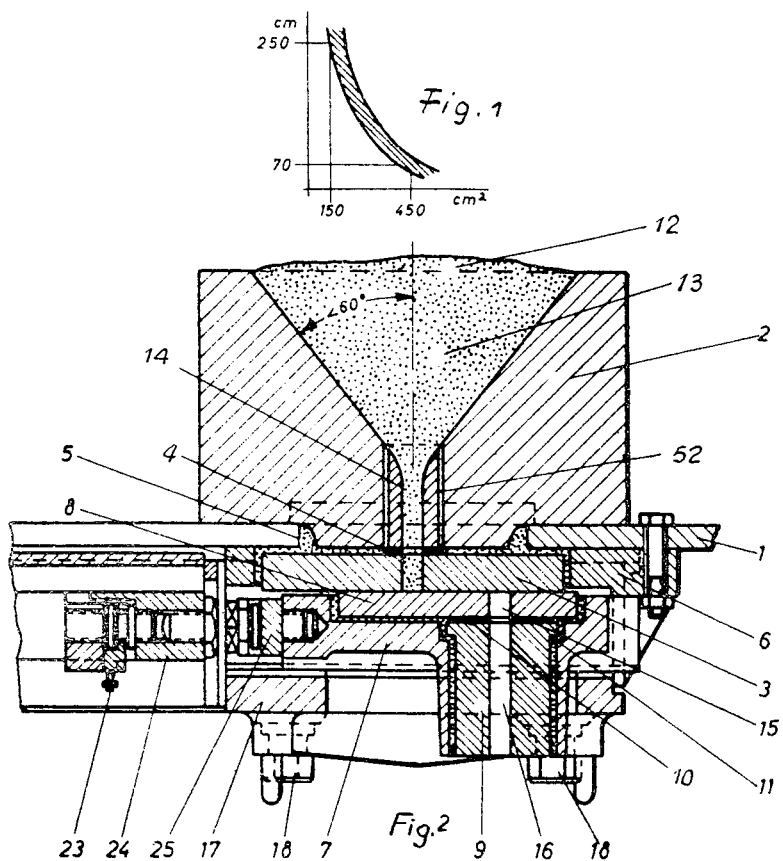
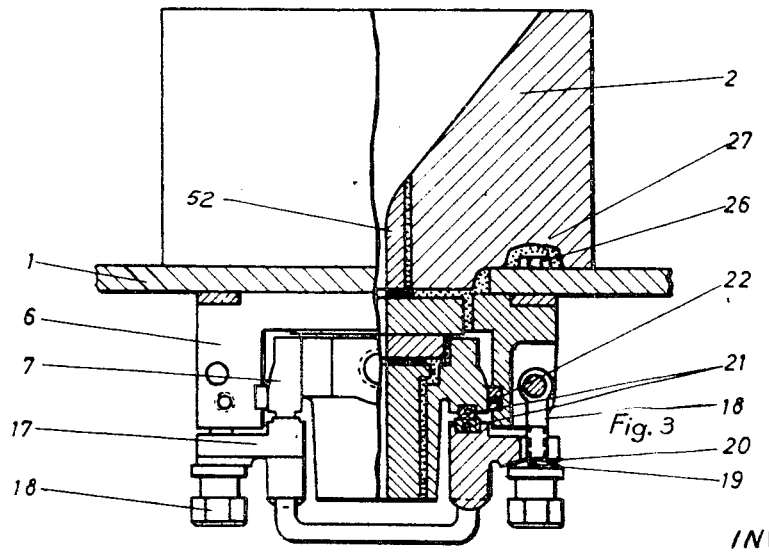
INVENTORS
KLAUS BICK,
BERNHARD TINNES
BY Stevens, Davis, Miller & Mosher
ATTORNEYS

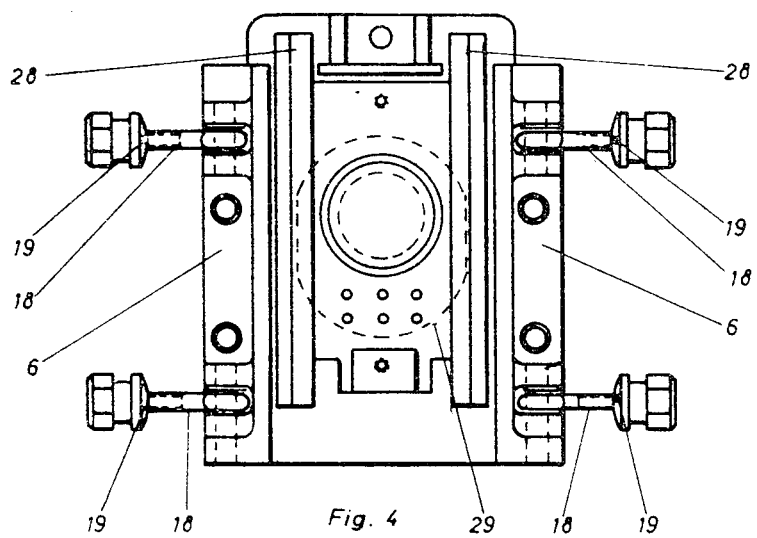
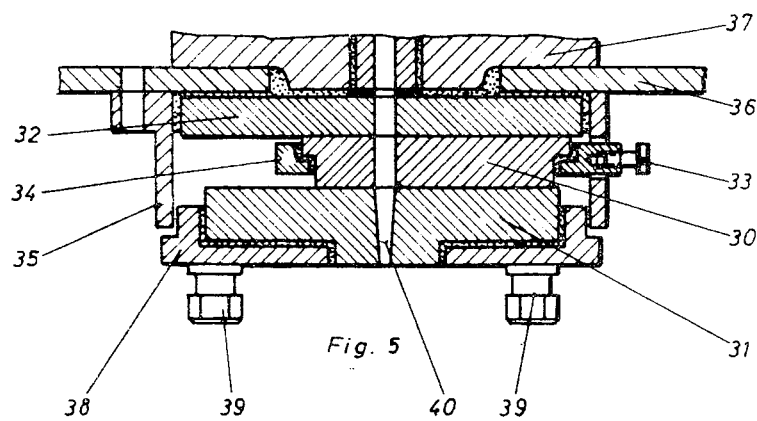
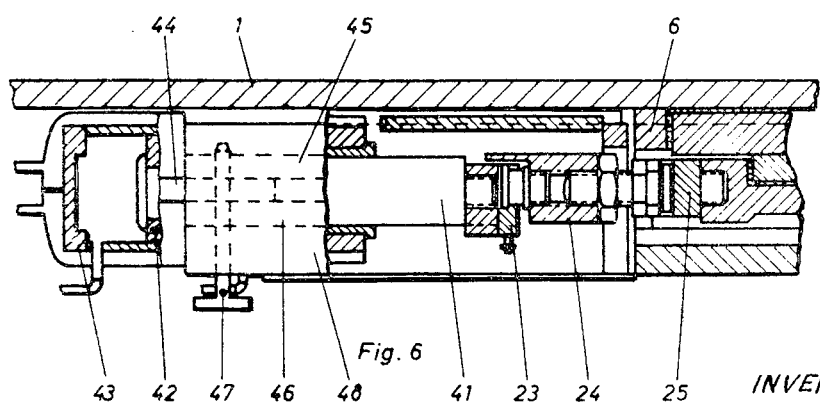
INVENTORS
KLAUS BICK,
BERNHARD TINNES
BY Stevens, Davis, Miller & Mosher
ATTORNEYS

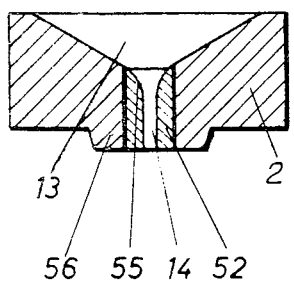
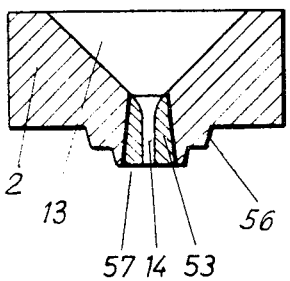
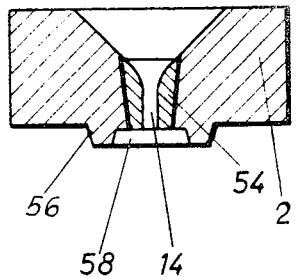
Fig. 9  Fig. 10  Fig. 11
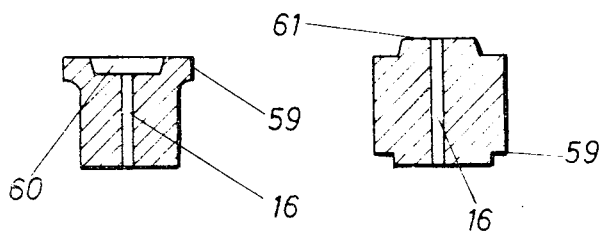
Fig. 12  Fig. 13  Fig. 14
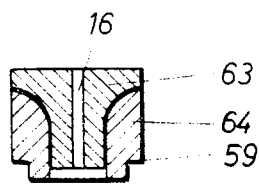
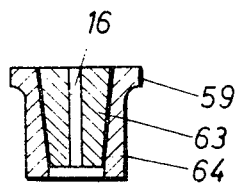
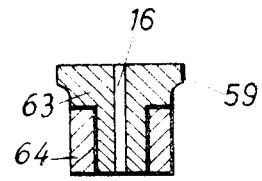
Fig. 15  Fig. 16  Fig. 17
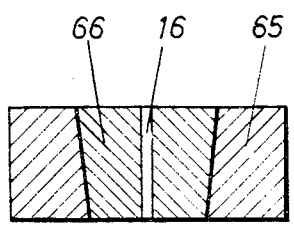
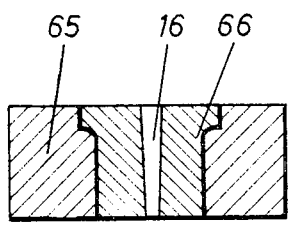
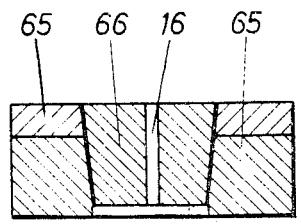
Fig. 18  Fig. 19  Fig. 20

INVENTORS
KLAUS BICK
BERNHARD TINNES

BY Stevens, Davis, Miller & Mosher
ATTORNEYS

United States Patent Office 3,511,261
Patented May 12, 1970

3,511,261
CONTROLLABLE TEEMING VALVE FOR STEEL-CASTING LADLES
Klaus Bick and Berhard Tinnes, Paderborn, Germany, assignors to Paderwerk Gebr. Benteler, Neuhaus, Kreis Paderborn, Germany
Filed Nov. 24, 1965, Ser. No. 509,574
Claims priority, application Germany, Nov. 25, 1964, P 35,554
Int. Cl. F16k *3/00;* B65d *47/26*
U.S. Cl. 137—315                                    24 Claims

ABSTRACT OF THE DISCLOSURE

A controllable teeming valve for steel-casting ladles, said valve comprising a longitudinal displaceable slide member disposed at the outlet opening, and a funnel-shaped inlet portion having an apex angle of less than 60° with respect to the axis of the funnel, a free opening of at least 150 square centimeters and a neck portion of at least 30 millimeters in length.

---

The invention relates to a valve for steel-casting ladles, and more particularly to a controllable teeming valve for steel-casting ladles with a longitudinally displaceable slide at the outlet opening.

A controllable teeming valve for steel-casting ladles is disclosed in U.S. Pat. 311,902 to Lewis. This ladle has the disadvantage that, when the slide is moved into the closed position, the steel present in the passage leading to the slide solidifies, whereupon after the slide has been moved back into its open position, a flow of steel from the ladle is impossible. This drawback always arises in casting operations when there is a substantial distance between the melting furnace and the casting point, or when the steel is subjected to intermediate treatment on the way.

In connection with a plug cock type of teeming valve, it has been suggested in British patent specification 183,241 to overcome this drawback by filling the cylindrical passage leading to the plug opening with carbon and sand. However, this solution is not adaptable to the casting of steel, because the filling materials become sintered in the cylindrical passage and thereby form an obstruction made of slag rather than metal.

It is therefore an object of this invention to overcome the above difficulties by providing a controllable teeming valve for steel-casting ladles having a longitudinally displaceable slide at the outlet opening. This invention is further characterized in that a funnel-shaped formation is provided in the valve inlet passage which contains highly refractory granular material before each filling of the ladle. Further, the head of the funnel has, in relation to the axis of the funnel, an opening angle of at least 60° with a free opening of at least 150 square centimeters, the final neck to the funnel having a length of at least about 30 millimeters.

The neck as well as the head of the funnel is filled with a highly refractory granular material which avoids a blockage and results in the discharge portion of the casting ladle no longer exhibiting the above-mentioned detrimental influence on the molten steel present in the ladle. The above dimensional requirements for the funnel further result in an elimination of the residue of the granular material in the bottom of the ladle on opening of the valve.

Moreover, these particular dimensions insure that the crust which forms at the interface between the molten steel in the ladle and the surface of the granular material on opening of the valve, is destroyed by the hydrostatic pressure of the steel in the casting ladle which alone may cause blockage in the neck of the funnel.

The amount specified for the funnel free opening can be seen from the illustration in FIG. 1 of the drawings in which the abscissa values show the free openings of the inlet to the valve and the ordinate values show the depth of molten steel above the inlet. The value of 150 square centimeters appears as a minimum value for the free opening. The curve for the magnitude of the opening angle follows from the size of the angle of repose for the highly refractory granular material. Finally, the dimension of at least about 30 millimeters for the length of the neck of the funnel allows for the provision of sufficient wear-resistant constructional material at the neck of the funnel without the necessity for increasing an enlargement of the constructional height of the inlet block, the latter, of course, leading to an increase in the cost of the contents of the ladle.

According to the present invention, the ceramic slide insert for the valve can be manufactured in two parts. This produces advantages from the constructional point of view, since the manufacture of such a body from one piece as provided in the known arrangement of U.S. Pat. No. 311,902, leads to undesirable stresses in the insert, and does not permit the two parts of the insert to be manufactured from different refractory materials.

According to a particular feature of the present invention, a clamping plate for the slide is provided which is secured to the supporting housing at the bottom of the ladle with the aid of four adjusting and clamping screws provided in the corners of the clamping plate. Sliding guides are also provided which extend along a length of the slide, so that, in their end positions, the guides extend beyond the clamping screws which are then disposed outwardly therefrom a distance corresponding to the amount of the stroke of the slide. This feature results in better loading of the sliding guide for the slide block and resultant protection of the guide against damage when being clamped, and thus provides a distinct advantage over the use of six clamping screws, as shown in the known arrangement according to U.S. Pat. No. 311,902.

If according to a further inventive feature, the adjusting and clamping screws are provided with domed surfaces which engage slightly concave seatings in the clamping plate, a uniform pre-loading may be obtained in a simple manner with a torque spanner.

An additional feature of the present invention is the use of two lower and lateral removable slide rails for guiding the slide. If the provision of such slide rails is already prevented by there being only a small gap between the sliding parts and their guiding elements, the fact that these rails are removable insures that continuous guiding of the slide itself is maintained even after the guide rails have become worn during use.

The controllable teeming valve of the present invention is further characterized by use of a slide block which is movable on a fixed outlet block. In comparison with the arrangement known from U.S. Pat. No. 311,902 this results in the advantage that the outlet block, which is stationary in the clamping cover of the slide arrangement, keeps the point of teeming at a constant position and accordingly makes possible a particularly accurate pouring with a small cross-section.

The actuation of the slide can be effected either hydraulically or with the aid of an electric motor drive. Preferably in the latter case the rotor shaft of the motor drive forms a unit with the spindle shaft of the slide. The above-mentioned methods of operation are distinguished by the fact that they make stepless control possible and thereby improve the proposed method of actuation. Moreover, such mechanical actuation of the slide also brings with it, for the clamping of the slide insert, the advantage that the magnitude of the preloading achieved by the clamping screws can be determined by the hydraulic or electric motor driving force which is measurable.

In supporting the bracket on the carrying housing for the slide, the bracket may be provided with guide rails extending in the direction of movement of the slide for the hydraulic or electric motor cylinder. The resulting combination of the actuating cylinder and the slide device into a single unit leads not only to an advantageous manner of operation in comparison with other methods of attachment, in that it avoids the effects of damaging external influences on the forces necessary for operating the slide device, but it also makes possible a unitary construction of the assembly of parts formed by the slide device and the associated actuating means.

A final important feature of the invention is achieved if, in the neck of the funnel, there is provided a replaceable wearing bush. This makes it possible, in a simple manner, to overcome any wear that may arise, since the worn bush may simply be replaced with a new one. Also, this provides the possibility of replacing a bush which has become completely or partially blocked by solidified slag or steel residues.

Further objects and advantages of the present invention will be apparent from the following description, reference being had to the accompanying drawings wherein preferred embodiments of the present invention are clearly shown:

FIG. 1 is a graph relating the amount specified for the free opening of the valve;

FIGS. 2 and 3 are longitudinal sectional and partially cut away side elevational views of the device of the present invention;

FIG. 4 is a bottom plan view of the embodiment of FIG. 3 without the clamping cover and without the refractory blocks;

FIG. 5 is a longitudinal sectional view through the device of FIGS. 2-4 in which a slide block is displaceable in relation to a stationary discharge block;

FIG. 6 depicts the slide device and the actuating cylinder in longitudinal section;

FIGS. 9-20 are longitudinal sectional views of the removable inserts for the teeming valve.

Figure 7:
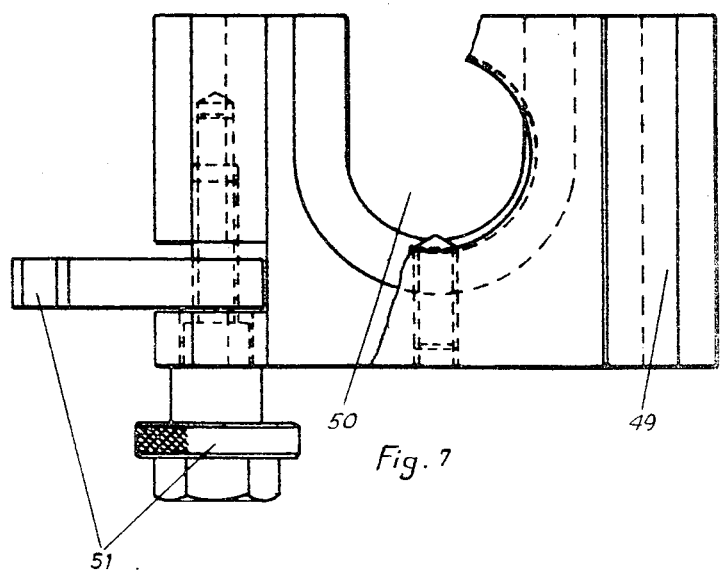
FIGS. 7 and 8 are elevational and plan views of a connection between the piston rod and an adjustable member between the slide housing and the actuating cylinder.

Referring specifically to FIGS. 2 and 3 which depict an adjustable teeming valve for a steel-casting ladle, the inlet block is shown by reference numeral 2 and is mounted on the sheet metal casing 1 of the ladle. The bottom block 3 is secured rigidly on the underside of the sheet metal casing 1. The securing of the bottom block 3 to the sheet metal casing 1 and to the inlet block 2 is effected with the aid of the ceramic mortar 4, which sets chemically at any temperature below 200°. The securing is also aided by a lower quality mortar shown at 5. The components 2 to 5 together form the inlet of the teeming valve.

Secured to the sheet metal casing 1 of the casting ladle is the carrying housing 6 for the slide device. Also provided are supporting frame 7, the slide block 8, and the discharge block 9. A ceramic mortar is disposed between the blocks 8 and 9 and sets at any temperature below 200°. For mounting the blocks 8 and 9 in the frame 7 a lower quality mortar 11 is utilized.

The inlet block 2 is of a funnel shape and is filled with highly refractory granular material 12 (for example, granular quartz) before each charge of molten steel is put into the casting ladle. This quartz not only fills the space in the head of the funnel 13, but also fills the neck 14 of the funnel for a length of about 60 millimeters for example. On further penetration into the teeming valve the quartz material is halted by the slide block 8, shown in FIG. 2 in its closed position. In this position bore 15 of slide block 8 is out of register with the extension 16 of the bore in the discharge block 9.

The filling of the funnel-shaped inlet with highly refractory granular material prevents the molten steel in the casting ladle penetrating into the neck of the funnel when the slide is closed, and thereby prevents the steel reaching a point in the valve inlet at which it could form a blockage if it were retained. Only after the slide has been opened and passage 14a of the bottom block 3 communicates with passages 15 and 16 does the sand filling 12 pass out of the valve, followed by the molten steel. The outlet velocity is determined either by the free cross-sectional area of the neck 14 of the funnel, which matches the cross-sectional area of the passage 14a in the bottom block 3 and passage 15 in the slide block 8, or by the restricted free cross-section present when passages 14a and 15 only partially overlap.

The slide block 8 is pressed against the bottom block 3 by a clamping plate 17 which is pre-loaded with the aid of the eye-bolts 18. The adjusting and clamping bolts 18 are provided with crowned portions 19 which engage in the slightly curved seatings 20 in the lugs of the clamping plate 17.

The guiding of the slidable frame 7 for the slide block 8 and the discharge block 9 is achieved with the aid of the two lower guide rails 21 and the lateral guide rails 22, each of which are provided on the outer side of the slide device. These rails are replaceable so that exact guiding is achieved at all times.

The actuation of the slide device 7, 8 and 9 is effected through an adjusting member 24 and a coupling piece 25, the latter being rigidly secured to the frame 7 of the slide device. The adjustable member 24 is attached to a connecting member 23 and makes it possible to match the spacing between the member and the coupling piece 25. Furthermore, a pointer, not shown in the drawing, can be mounted on member 24 to show the positions of the slide device 7 to 9 at any instant and thereby indicate the degree of opening of the discharge from the inlet portion of the teeming valve.

FIG. 3 depicts the manner of attachment of the carrying housing 6 on the sheet metal casing of the casting ladle. The attachment screw 26 provided for this purpose is received in the recess 27 on the underside of the inlet block 2.

FIG. 4 shows the four adjusting and clamping bolts 18 which are disposed in the corners of the clamping plate 17 (not shown) and which have been pivoted outward from their position shown in FIG. 3. The slide rail guide 28 has such a length that, in its end position it extends beyond the clamping bolts by a distance corresponding to the length of the stroke of the slide block 8. The spacing of the eye-bolts 18 in the longitudinal direction of the carrying housing is so that the cut-away portion 29 for the slide block 8, not visible here, remains within the range of spacing of the bolts 18 in the longitudinal direction of the supporting structure 6 in all positions of the guide.

FIG. 5 depicts an embodiment in which the slide block 30 is displaceable with respect to the discharge block 31, the latter being held in a stationary position by the coupling piece 33. Slide block 30 is displaceable between the discharge block 31 and the bottom block 32 and is held by the frame 34. The supporting structure 35 for the slide device 30 to 32 is again secured to the sheet metal casing 36 of the casting ladle, in the floor of which is disposed the inlet block 37 for the teeming valve. The components of the slide device with its supporting housing 35 are held together by the clamping plate 38 by means of eye-bolts 39.

As well as accurately directed teeming into the casting molds as a consequence of the permanently fixed position of the discharge passage 40, the outwardly contracting conical shape also results in a smoothing of the outflowing stream of steel.

In FIG. 6 the details of the actuating drive in its hydraulic form are shown. As well as the coupling member 25 already mentioned (see FIG. 2) the adjustable member 24, and the connecting member 23, there is also provided a piston rod 41 attached at one end to the connecting member and at the other end to piston 42 of the hydraulic cylinder 43. This actuating drive is connected to the carrying housing 6, as explained above, the support 44 of the hydraulic cylinder 43 being secured to the cylinder mounting 48 with the aid of the rails 45 and 46 and pins 47.

Figure 8:
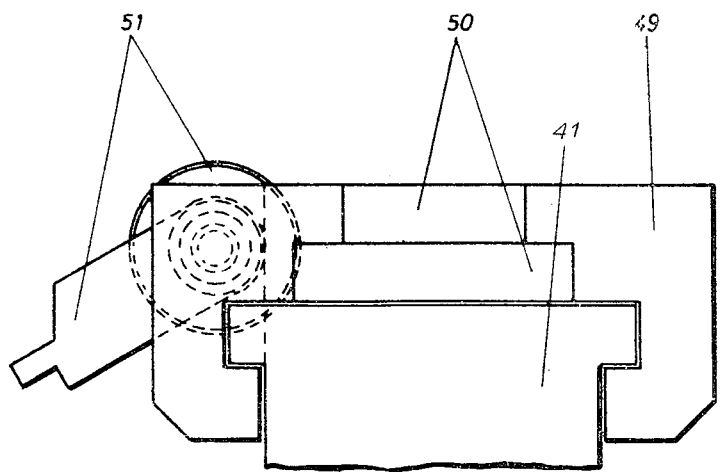

The connecting member 23 is seen in detail in FIGS. 7 and 8. The free end of the piston rod 41 (see FIG. 6) produces, via the coupling member 49, the connection between the actuating drive and the adjustable member 24 (FIG. 6), the latter being received by the notches 50. The connection is secured by the locking screw 51.

Referring to FIGS. 9 to 11 the replaceable wearing bushes 52 to 54 are shown which extend around the neck of the funnel 14 as seen in FIG. 2. These bushes, as well as the adjacent portion of the inlet block 2 may take various forms. For example, FIG. 9 shows a simple replaceable wearing bush 52 having a cylindrical external surface, the profile 55 of the wear-resistant material being shaped to follow the line of flow at the transition point between the head 13 of the funnel and its neck 14. The projecting portion 56 of the inlet block 2 extending around the free end of the wearing bush 52 is of single-stepped shape in this example.

In the embodiment of FIG. 10 the outer surface of the wearing bush 53 tapers conically inwards in a direction towards the head 13 of the funnel. This enables the bush to be inserted from below and to be firmly seated. The inlet block 2 in this case has a projecting surface 57 around its opening on the face which surrounds the neck 14 of the funnel and engages the bottom block.

In the arrangement shown in FIG. 11 the outer surface of the wearing bush 54 tapers conically outwards towards the free end of the neck 14 of the funnel, enabling the wearing bush 54 to be inserted from the funnel-head end and firmly seated in the cone portion. The inlet block 2 in this case has a mouth surface 58 which is counterbored or set back in the face which engages the bottom block and surrounds the neck of the funnel.

By the provision of the counterbored or projecting mouth surface of the neck of the funnel or its wearing bush, labyrinth seals are formed in cooperation with correspondingly shaped parts of the bottom block. With a suitable coating or mortar they prevent escape of the steel through the sealing passages between the inlet block 2 and bottom block 3.

The discharge block (9 in FIGS. 2 and 3) can likewise take various forms as shown in FIGS. 12–17. A supporting collar 59 may be provided in each of these forms as shown. The shape of the upper end of the discharge block 9, i.e. that end which faces the slide block, can incorporate a counterbored mouth 60 or a projecting mouth surface 61 around the bore 16 as seen in FIGS. 12 and 13 respectively. Also at its lower end the bore 16 can have a counterbored mouth 62 as seen in FIG. 14. Here also the counterbored back or projecting mouth on that end which faces the slide block serves to produce a labyrinth seal. The counterbored mouth 62 protects the periphery of the bore 16 against the formation of nodules of steel caused by excessive cooling.

This excessive cooling is furthermore reduced by the two-part construction of the discharge block shown in FIGS. 15 to 17, in which the inner insert 63 is made of wear-resistant material throughout, and the outer part 64 is made of thermally insulating material.

FIGS. 18 to 20 each show a different mounting of the discharge block 9 in the slide block of FIGS. 2 and 3.

Supporting body 65 serves as a permanent lining in cooperation with the inserted block 66 of wear-resistant material. The outer surface of the insert 66 is formed here so that this body can be inserted from that end which faces the bottom block. Since the surface of the insert 66 is of a conically tapering shape, it is firmly held in the supporting body 65. The dividing line between the two-part bodies 65 in FIG. 20 permits the upper part to be made of wear-resistant material and the lower part of thermally insulating material.

Instead of the two-part construction of the block shown in FIGS. 15 to 17 and 20, equally differing characteristics can also be achieved by varying the porosity of the structure of the block in a direction from inside to outside. For example, since the nozzle is formed of ceramic material which by its nature has a certain porosity, the material may be compacted harder in the inner region than in the outer region so that the porosity is least on the inside and greatest at the outside.

Figure 21:
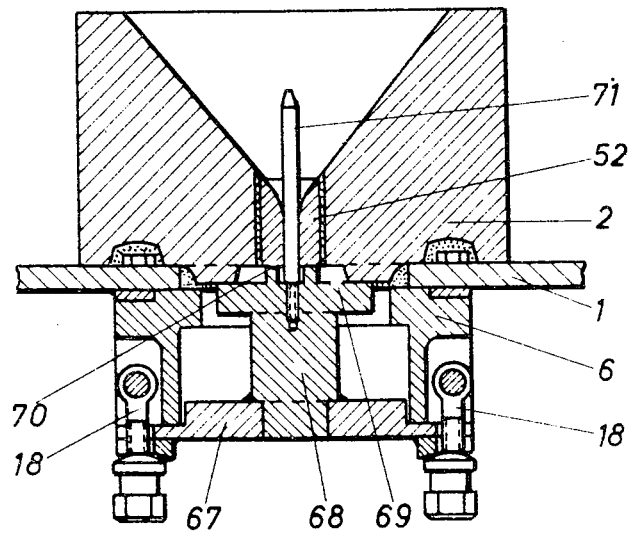
FIGS. 21-24 are longitudinal sectional views of auxiliary devices for the insertion and adjustment of cooperating refractory components of the teeming valve.

Referring to FIG. 21, the supporting plate 67 can be mounted on the carrying housing 6 with the aid of eye-bolts 18. The intermediate pedestal portion 68 of the supporting plate 67 has abutment surfaces 69 and 70 for the inlet block 2 and the wearing bush 52, and carries the centralizing pin 71. With the aid of these components the wearing bush 52 can be adjusted in the cylindrical recess of the inlet block 2 and the inlet block itself can be adjusted with the necessary accuracy. By means of two adjusting screws which can be provided (not shown in the drawing) between the supporting housing 6 and the supporting plate 67, the supporting plate can be adjusted with respect to the carrying housing in a longitudinal direction in the desired manner.

Figure 22:
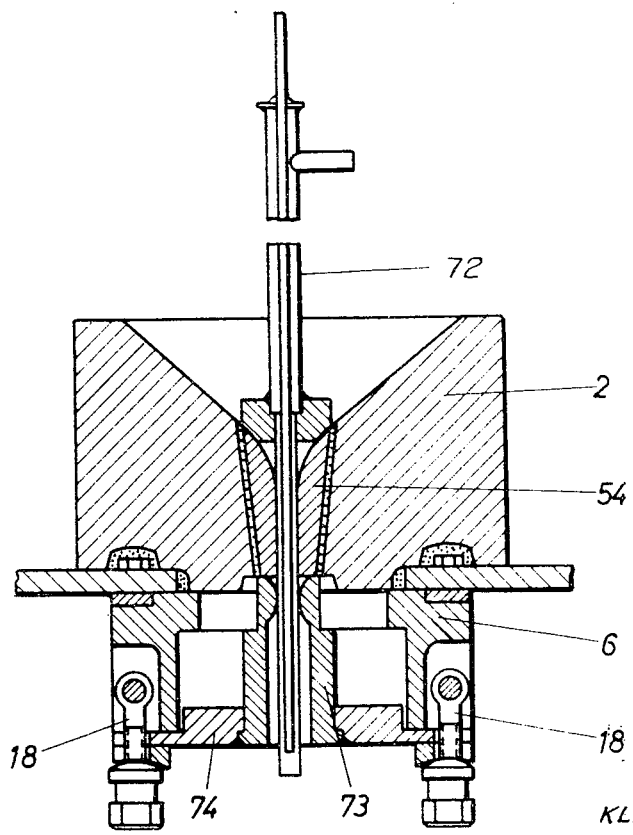

For the replacement of the wearing bush 54, which has an external surface that tapers conically towards the outlet, we provide the water-cooled centralizing pin 72 shown in FIG. 22, which is guided in the receivers 73 on the outlet side of the inlet block 2, and which is secured in a supporting plate 74 mounted on the carrying housing 6. Again, supporting plate 74 is secured on the carrying housing 6 with the aid of eye-bolts 18.

Figure 23:
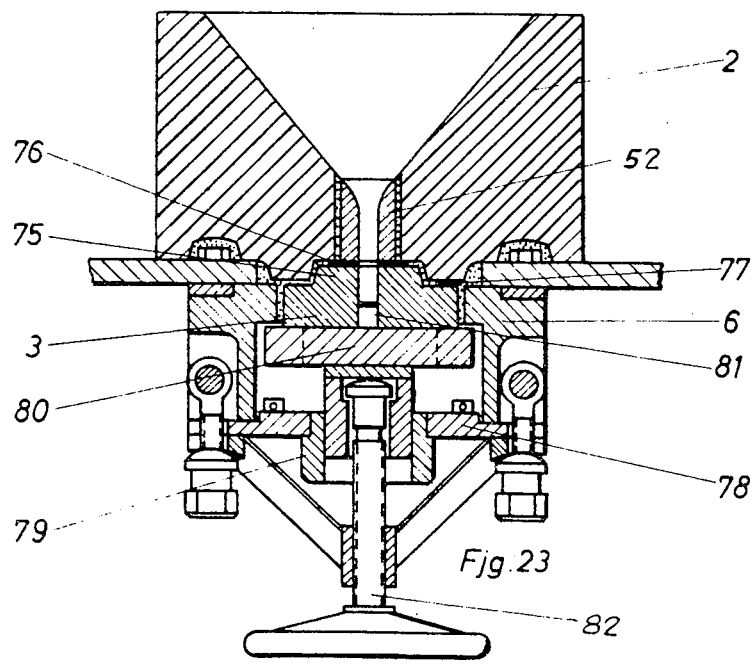

The auxiliary device shown in FIG. 23 makes it possible to mount the bottom plate 3 on the underside of the inlet block 2 and the wearing bush 52. Between this bush and the projecting engaging surface 75 of the bottom block 3 the ceramic mortar 76 is provided which sets chemically at any temperature under 200°, while the other joints of the labyrinth seal 77, mortar of less high quality is used. The bottom block 3 is aligned in its bed of mortar with the aid of the supporting plate 78 mountable on the supporting housing 6, the intermediate pedestal portion 79 of the plate 78 allowing the guiding of the abutment plate 80 and the centralizing pin 81. In this arrangement the adjustable part of the auxiliary device can be displaced horizontally with the aid of an adjusting screw, not shown in the drawing. The abutment plate 80 is adjustable vertically by movement in the pedestal portion 79 under the action of the spindle drive 82.

Figure 24:
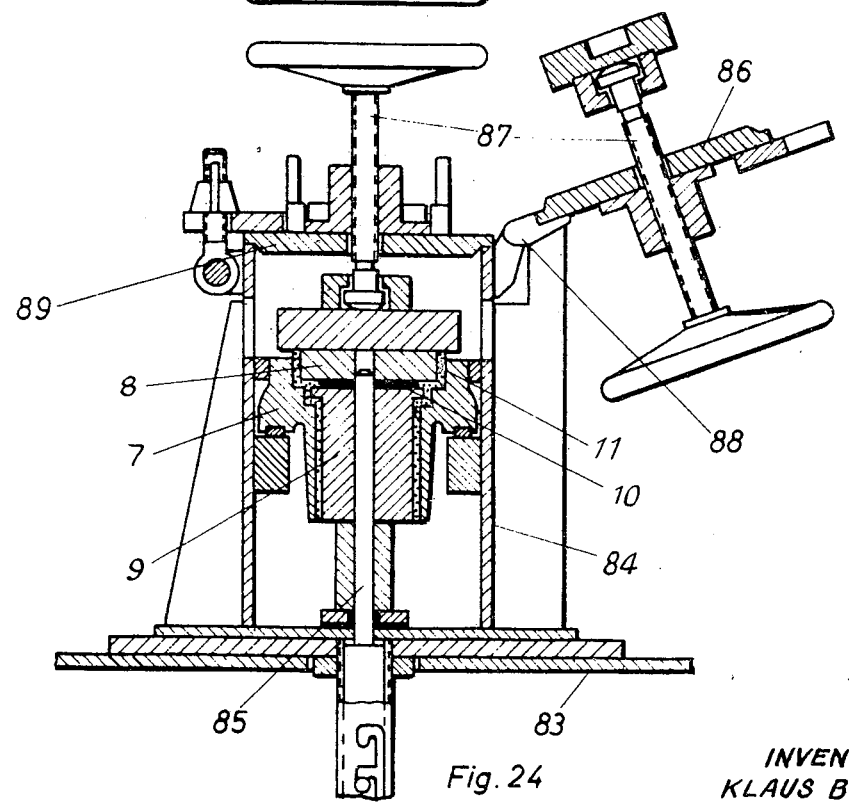

FIG. 24 shows how both members 8 and 9 can be mounted and adjusted within the slide device 7. The centralizing pin 85 provided in the base plate 83 of the auxiliary device 84 locates the lower discharge block 9 and, with the aid of the flap 86, the block is first secured and aligned in its bed of mortar in the slide frame 7. Then the flap 86 is disengaged with the screwed spindle arrangement 87 and swung back about the pivot 88, whereupon the cover 89 on the frame structure of the auxiliary device 84 is swung into place and thereby locates the slide block, which has previously been slipped over the adjusting pin 85, in the mortar bed 10 and 11.

The adjustable teeming valve described is suitable primarily for steel casting ladles. However, in its various embodiments it can also find employment in casting ladles for the pouring of other metals.

There has been illustrated and described what is con-

What is claimed is:

1. A bottom closure for steel casting ladles having an inlet block at the bottom of a ladle and provided with a substantially funnel-shaped recess for receiving a refractory granular material prior to each filling of the ladle; said funnel-shaped recess comprising an opening angle of less than 120°, an inlet opening of at least 150 square centimeters and a depending funnel neck portion of at least 30 mm. length; and an outlet channel having a slider that reciprocates horizontally in a guide enclosure at said outlet channel, said slider having a movable closing plate of refractory material provided with an opening which selectively coincides with the outlet channel, the latter having connected therewith a discharge spout at least in the open position of said slider, said bottom closure comprising a wearing bushing of refractory material tightly inserted in said funnel neck portion of the inlet block, a bottom plate between said bushing and the movable closing plate serving together with said bushing as a sealing element between said inlet block and said outlet channel, said bushing being positioned within said funnel neck portion in a position perpendicular to the bottom plate, a highly refractory mortar rigidly connecting a lower annular surface of said bushing with said bottom plate, a mortar which is less solid than said highly refractory mortar substantially filling the joint region between said inlet block and bottom plate located outwardly of said annular surface.

2. The ladle of claim 1 further comprising a housing in which said slide member is carried, a plate retaining said slide member in said housing and a plurality of adjusting and clamping screws provided at the corners of said plate and securing said plate to said housing.

3. The ladle of claim 2 wherein said adjusting and clamping screws are provided with crowned surfaces which cooperate with concave engaging surfaces on said plate.

4. The ladle of claim 2 further comprising two cooperating lower replaceable guide tracks disposed on said slide member and said plate, and two cooperating lateral guide tracks disposed on said slide member and said housing, said tracks being adapted to guide said slide member, the length of said guide tracks extending outward from said plate a distance from said screws corresponding to the maximum distance said slide member can travel.

5. The ladle of claim 2 further comprising a cylinder fixed adjacent the side of said housing and having a piston, the free end of which is operatively connected to said slide member, and means to actuate said piston to effect said displacement of said slide member.

6. The ladle of claim 5 wherein said actuating means is hydraulically operated.

7. The ladle of claim 1 wherein the outer surface of said bush is of a conical configuration.

8. The ladle of claim 1 further comprising a housing in which said slide member is carried, a support plate adjustably mounted on said housing and supporting said guide member, a pin extending through said inlet opening and secured to said support plate for adjusting said bush with respect to said inlet opening.

9. The ladle of claim 1 further comprising a housing in which said slide member is carried, a support plate adjustably mounted on said housing and supporting said guide member, a water-cooled pin extending through said inlet opening and said support plate for adjusting said bush with respect to said inlet opening.

10. The ladle of claim 1, wherein said control means further comprises a discharge block fixed with respect to said slide member and having a passage extending therethrough registering with said bore in said slide member.

11. The ladle of claim 10 further comprising a supporting collar formed on the face of said discharge block adjacent said slide member.

12. The ladle of claim 10 further comprising a projecting abutment formed on the face of said discharge block adjacent said slide member.

13. The ladle of claim 10 further comprising a recessed counterbore formed on the face of said discharge block adjacent said slide member.

14. The ladle of claim 10 further comprising a recessed counterbore formed on the face of said discharge block remote from said slide member.

15. The ladle of claim 10 wherein said discharge block comprises an inner portion of a wear-resistant material and an outer portion of a thermally insulating material.

16. The ladle of claim 15 wherein said inner portion is wedged in said outer portion.

17. The ladle of claim 10 wherein said discharge block is of a material whose porosity increases from the inside to the outside portions of said block.

18. The ladle of claim 10 wherein said discharge block is mounted in said slide member.

19. The ladle of claim 18 wherein said slide member is in the form of a permanent casing comprising a wear-resistant upper portion and a thermally insulating lower portion abutting said upper portion.

20. The ladle of claim 10 further comprising an alignment pin extending through said discharge block and said slide member and means pivotably mounted with respect to said housing for locating said slide member therein.

21. The ladle of claim 1, wherein the free end of said inlet block has a projecting portion formed thereon.

22. The ladle of claim 1, wherein the free end of said inlet block has a projecting mouth portion formed thereon.

23. The ladle of claim 1, wherein the free end of said inlet block is provided with a recessed face.

24. The ladle of claim 23 further comprising a bottom block disposed adjacent said inlet opening, an abutting plate disposed between said bottom block and support plate, and a pin carried by said abutting plate and extending into said bottom block to align said block with respect to said outlet opening.

References Cited

UNITED STATES PATENTS

| | | | |
|---|---|---|---|
| 311,902 | 2/1885 | Lewis | 222—561 X |
| 410,192 | 9/1889 | Price | 222—567 X |
| 506,328 | 10/1893 | Morris | 222—505 |
| 510,062 | 12/1893 | Downs | 222—561 |
| 685,964 | 11/1901 | Baldt | 222—567 |
| 2,252,635 | 8/1941 | Karr | 222—567 |
| 2,961,722 | 11/1960 | Lilljekvist et al. | 222—567 |
| 3,352,465 | 11/1967 | Shapland | 222—561 X |

FOREIGN PATENTS 1,155,082  11/1957  France.

ARNOLD ROSENTHAL, Primary Examiner

U.S. Cl. X.R.

251—62, 326, 368; 222—561